United States Patent Office 3,166,592
Patented Jan. 19, 1965

3,166,592
PRODUCTION OF ALKYL META-AMINO
PHENYL SULFIDES
Joseph Levy, Paramus, N.J., and Joseph H. Mayer, New
York, N.Y., assignors, by mesne assignments, to Universal Oil Products Company, Des Plaines, Ill., a corporation of Delaware
No Drawing. Filed May 20, 1960, Ser. No. 30,440
5 Claims. (Cl. 260—580)

This invention relates to new and improved procedures for the production of lower alkyl meta-aminophenyl sulfides which are valuable as intermediates for pharmaceuticals and dyes.

The production of alkyl meta-aminophenyl sulfides, such as meta-thioanisidine for example, has been accomplished heretofore by using metanilic acid as a starting material (Zincke and Muller-Ber. 46, 775, 1913). This acid was first acetylated and converted to the sodium salt, after which it was treated with phosphorous pentachloride to form the sulfonyl chloride. This was then reduced in two steps, first to produce bis(meta-acetylaminophenyl)disulfide and then to produce meta-acetylaminothiophenol. The sulphydryl group of the latter compound was then methylated, after which the acetyl group was hydrolized to give the desired meta-thioanisidine.

Methods of this character are cumbersome and time-consuming. Moreover, the yield of the desired end product is not always satisfactory.

In accordance with the present invention, these objections and limitations of the prior art are overcome and a method is provided wherein all of the steps of the process can be carried out in the same reaction vessel without isolating the intermediate products. In this way, the procedure is simplified, the handling of intermediate malodorous materials is avoided, and high yields of substantially pure end products are obtained.

Accordingly, the object of the present invention is to provide simplified and improved methods for producing alkyl meta-aminophenyl sulfides.

A specific object of the invention is to effect the production of alkyl meta-aminophenyl sulfides in a single continuous operation withhout the isolation of intermediate products and in a manner which assures high yields of substantially pure products.

These and other objects and features of the present invention will appear from the following description thereof wherein preferred procedures and typical examples are cited for the purpose of indicating the nature of the invention but without intending to limit the invention thereby.

In general, the process of the present invention employs bis(meta-nitrophenyl)disulfide as a starting material for the reaction. This material is first treated with an alkali sulfide to produce the alkali salt of meta-nitrothiophenol. This product is not isolated but may be treated in the same reaction vessel with an alkali hydroxide an alkylating agent such as a dialkyl sulfate for example. The resulting alkyl meta-nitrophenyl sulfide is a malodorous material, but again it need not be isolated but may be reduced to the corresponding amine in the initial reaction vessel without interruption in the process. This can be accomplished by conducting the reduction under alkaline conditions by addition of an inorganic, sulfur containing reducing agent to the reaction mixture.

In this manner, reduction of the amine proceeds smoothly and completely to give excellent yields of highly pure products. Moreover, isolation of the desired alkyl meta-aminophenyl sulfide from the reaction mixture can be effected by simple extraction and distillation procedures.

In carrying out the process, the alkali sulfide used to react with the bis(meta-nitrophenyl)disulfide in producing the salt of meta-nitrothiophenol may be any inorganic sulfide such as sodium, potassium or lithium sulfide. These need only be used in molar amounts and may be employed either in the presence of water or with the further addition of an alcohol such as methanol, ethanol, propanol, or the like. The reaction preferably is carried out at temperatures of from about 40° to 100° C. although temperatures as low as 25° C. may be used.

In effecting the alkylation of the salt of meta-nitrothiophenol, it is generally preferable to employ a dialkyl sulfate such as dimethyl sulfate, diethyl sulfate, and the like. However, other alkylating agents may be used such as alkyl chlorides or bromides or lower alkyl toluene sulfonates.

The alkylation is carried out under alkaline conditions using sodium hydroxide for example and in practice it is preferable to add the alkylating agent gradually to the reaction mixture while maintaining the reaction temperature between about 40° and 80° C. However, the reaction may be carried out at temperatures as low as 25° C. and completed at refluxing temperatures. The amount of the alkylating agent used is generally somewhat in excess of theory and may range from about 1 to 3 moles of alkylating agent for each mole of the disulfide originally employed in starting the reaction.

Reduction of the alkyl meta-nitrophenyl sulfide thus obtained is effected by employing an aqueous inorganic sulfide or polysulfide solution. Aqueous sodium disulfide is preferred and may be conveniently prepared by heating equimolar amounts of sulfur and sodium sulfide in water until a clear solution is obtained. Sodium sulfide, sodium hydrosulfide or sodium polysulfide may be used instead of the disulfide if desired. If preferred, other inorganic sulfides or polysulfides such as ammonium or potassium sulfide or polysulfide may be used. Furthermore, other inorganic sulfur containing reducing agents such as the alkali hydrosulfites may be used.

The reduction reaction is carried out at temperatures of about 60° C. or higher and preferably by refluxing at about 100° C. From about 1 to 2 moles of sodium disulfide per mole of bis(meta-nitrophenyl)disulfide is sufficient to assure reduction of the alkyl meta-nitrophenyl sulfide to produce the desired alkyl meta-aminophenyl sulfide. This product can then be separated from the reaction mixture by extraction and can be readily purified by distillation to give yields of from about 70 to 90% of theory.

In order to illustrate typical and specific procedures in accordance with the present invention, the following examples are cited.

Example 1

172 g. bis(meta-nitrophenyl)disulfide (M.P.=77–80° C.) (0.56 M) were heated with 400 g. water to about 75° C. and 149 g. of a 29.4% aqueous sodium sulfide solution (0.575 M) were gradually added with stirring during about one-half hour. Reaction took place with solution of the disulfide. The mixture was then stirred at about 75° C. for one hour and then cooled to about 45° C. 106 gms. dimethyl sulfate (0.84 M) were then added during a period of about ¾ hour while maintaining the temperature at about 45 to 50° C. A solution of 44 g. sodium hydroxide (1.1 M) in about 100 g. water was added and the mixture gradually heated to reflux during about one hour and maintained at reflux for three hours. Then added at reflux in about ½ hour a solution obtained by heating 160 g. technical flake sodium sulfide (60% Na$_2$S) (1.232 M) plus 40 g. sulfur (1.232 M) in 145 g. water. The mixture was refluxed for about four hours and then cooled to about 80° C. The top oil layer was then extracted with 200 g. toluene.

The waters were again extracted with 200 g. toluene and the combined extracts were then stripped to remove the toluene and finally distilled in vacuo. There were obtained 140 g. meta-thioanisidine distilling at about 120° C. at 3 mm. and analyzing 99%. The infra-red spectrum of this material was identical with an authentic sample and showed the absence of any unreduced nitro compound. The overall yield calculated on the starting material, bis(meta-nitrophenyl)disulfide, was 90% of theory.

*Example 2*

172 g. bis(meta-nitrophenyl)disulfide (non-recrystallized material of M.P.=74.6–77° C.) were heated to reflux (about 75° C.) with a mixture of 130 g. water plus 103 g. methanol, and 271 g. of a 16.1% aqueous sodium sulfide solution (0.56 M $Na_2S$) were gradually added with stirring during about one hour. The mixture was refluxed for another hour and then cooled to 45° C. A solution of 40 g. sodium hydroxide in 90 g. water was added followed by the gradual addition of 145 g. dimethyl sulfate during a period of about one hour while maintaining the temperature at about 45° C. The mixture was stirred for an additional hour at 45° C. and then heated to reflux (about 85° C.) for one hour. The reduction of the nitro group was then accomplished by the gradual addition in about one-half hour of a sodium disulfide solution which had been prepared by heating 260 g. technical flake sodium sulfide (60%) with 24 g. sulfur in 400 g. water. The reaction mixture was maintained at reflux for about four hours and then extracted at about 40° C. with two 200 g. portions of toluene. The combined extracts were then washed with 300 g. of 3% salt solution and the toluene removed at the water pump. The remaining oil was then distilled in vacuo to give 133.4 g. meta-thioanisidine distilling at 115–118° at about 2 mm. pressure.

*Example 3*

154 g. bis(m-nitrophenyl)disulfide (0.5 M) were heated to about 75–80° C. with 400 g. water and 136 g. of a 29.46% aqueous sodium sulfide solution were added in about one hour. The mixture was stirred for an additional hour at about 75° C. and then heated to reflux (about 103° C.) in one-half hour. 154 g. diethyl sulfate (1 M) were then added in about one hour followed by 80 g. of a 50% aqueous sodium hydroxide solution added in about one-half hour while maintaining the temperature at about 100° C. After refluxing for another three hours, a sodium disulfide solution prepared by heating 195 g. technical flake sodium sulfide (60%) plus 60 g. sulfur in 170 g. water was added in about one-half hour and the mixture then refluxed for four hours. After cooling to about 75° C., the top oil layer was extracted with two 150 g. portions of toluene and the combined extracts stripped of solvent at the water pump. The remaining oil was then distilled in vacuo to give 113 g. of meta-thiophenetidine distilling at about 122° C. at 3 mm. pressure. The overall yield was 72% of theory.

All of the reactions are carried out in the same vessel as a continuous process without isolating any of the intermediate products produced. Therefore, the reaction is initiated by employing bis(meta-nitrophenyl)disulfide and is continued on through until the relatively innocuous alkyl meta-aminophenyl sulfide is obtained without separating or handling the malodorous compounds formed during the course of the reaction. Moreover, the entire process is carried out in a single vessel at temperatures of from about 25° C. to refluxing and as a continuing operation whereby the procedure is greatly simplified and the cost of producing the desired end products is reduced.

In each of the examples cited heretofore, other soluble inorganic sulfides may be used in producing the salt of meta-nitrothiophenol and substantially any alkylating agent capable of reaction with the salt produced can be employed to obtain the alkyl meta-nitrophenyl sulfide. Similarly, other inorganic sulfur containing reducing agents can be employed in effecting the reduction of the nitro group to obtain the desired end product.

It will, therefore, be apparent that the invention is capable of many variations and modifications to obtain numerous lower alkyl meta-aminophenyl sulfides. In view thereof, it should be understood that the particular methods and products cited in the examples and described above are intended to be illustrative only and are not intended to limit the scope of the invention.

We claim:

1. In a method of producing a lower alkyl meta-aminophenyl sulfide in high yield comprising reacting an alkali metal salt of meta-nitrothiophenol with an alkylating agent to form a lower alkyl meta-nitrophenyl sulfide and reducing the nitro group of the latter compound to form the corresponding lower alkyl meta-aminophenyl sulfide, the improvement which comprises carrying out said reduction without separating the lower alkyl meta-nitrophenyl sulfide from its reaction mixture and utilizing as a reducing agent for said reduction an aqueous alkaline solution of a compound selected from the group consisting of alkali metal and ammonium sulfides, polysulfides and hydrosulfites.

2. The process of claim 1 wherein said reduction is carried out at a temperature of about 60° C. to about 100° C.

3. The process of claim 1 wherein the lower alkyl meta-nitrophenyl sulfide is methyl meta-nitrophenyl sulfide and the compound produced is meta-thioanisidine.

4. The process of claim 1 wherein the lower alkyl meta-nitrophenyl sulfide is ethyl meta-nitrophenyl sulfide and the compound produced is meta-thiophenetidine.

5. In a method of producing a lower alkyl meta-aminophenyl sulfide in high yield comprising reacting an alkali metal salt of meta-nitrothiophenol with dialkyl sulfate and aqueous sodium hydroxide to form the corresponding lower alkyl meta-nitrophenyl sulfide and reducing the nitro group of the latter compound to form the corresponding lower alkyl meta-aminophenyl sulfide, the improvement which comprises carrying out said reduction without separating the lower alkyl meta-nitrophenyl sulfide from its reaction mixture and utilizing as a reducing agent for said reduction an aqueous alkaline solution of a compound selected from the group consisting of alkali metal and ammonium sulfides, polysulfides and hydrosulfites.

References Cited in the file of this patent

Brand et al.: Ber. Deut. Chem., vol. 70, pp. 284–296 (1937).

Werner: Ind. Eng. Chem., vol. 40, pp. 1574–1589 (1948).